(12) United States Patent
Turnbull et al.

(10) Patent No.: US 12,499,695 B2
(45) Date of Patent: Dec. 16, 2025

(54) DETECTION SYSTEM WITH A SINGLE MODE LASER FOR A VEHICLE

(71) Applicant: Gentex Corporation, Zeeland, MI (US)

(72) Inventors: Robert R. Turnbull, Holland, MI (US); Guy Raz, Binyamina (IL)

(73) Assignee: GENTEX CORPORATION, Zeeland, MI (US)

( * ) Notice: Subject to any disclaimer, the term of this patent is extended or adjusted under 35 U.S.C. 154(b) by 124 days.

(21) Appl. No.: 18/500,187

(22) Filed: Nov. 2, 2023

(65) Prior Publication Data

US 2024/0153282 A1    May 9, 2024

Related U.S. Application Data

(60) Provisional application No. 63/422,482, filed on Nov. 4, 2022.

(51) Int. Cl.
*G06V 20/00* (2022.01)
*A61B 5/00* (2006.01)
*B60H 1/00* (2006.01)
*E05F 15/71* (2015.01)
*E05F 15/73* (2015.01)
*G01K 3/00* (2006.01)
(Continued)

(52) U.S. Cl.
CPC .......... *G06V 20/593* (2022.01); *A61B 5/0077* (2013.01); *B60H 1/00742* (2013.01); *E05F 15/71* (2015.01); *E05F 15/73* (2015.01); *G01K 3/005* (2013.01); *G06T 7/248* (2017.01); *G06T 7/521* (2017.01); *G06V 10/145* (2022.01); *G06V 40/15* (2022.01); *E05F 2015/767* (2015.01); *E05Y 2900/55* (2013.01); *G06T 2207/30268* (2013.01)

(58) Field of Classification Search
CPC .... G06V 10/145; G06V 20/593; G06V 40/15; G06T 7/521; G06T 2207/30268; B60H 1/00742; A61B 5/0077
See application file for complete search history.

(56) References Cited

U.S. PATENT DOCUMENTS

2003/0116698 A1\* 6/2003 Hayashi ............ B60R 21/01552
250/221
2018/0266876 A1   9/2018 Carmon
(Continued)

FOREIGN PATENT DOCUMENTS

WO    2019023875 A1    2/2019

*Primary Examiner* — Kevin K Pyo
(74) *Attorney, Agent, or Firm* — Price Heneveld LLP; Brian James Brewer

(57) ABSTRACT

A detection system for a vehicle includes an imaging device configured to capture an image of an interior surface of the vehicle. An illumination assembly includes an array of laser diodes each configured to project an illumination, each laser diode is configured as at least one of a single mode laser or a vertical-cavity surface-emitting laser ("VCSEL"). An optical element is proximate to the array of laser diodes and includes a collimation element for guiding the illumination to form at least one light spot. A processor is in communication with the imaging device and the illumination assembly. The processor is configured to communicate a signal to operate the array of laser diodes and process the image of the interior surface to detect at least one of a change in a location or a speckle content of the at least one spot.

20 Claims, 5 Drawing Sheets

(51) Int. Cl.
  *G06T 7/246* (2017.01)
  *G06T 7/521* (2017.01)
  *G06V 10/145* (2022.01)
  *G06V 20/59* (2022.01)
  *G06V 40/10* (2022.01)

(56) References Cited

U.S. PATENT DOCUMENTS

| | | |
|---|---|---|
| 2019/0094355 A1 | 3/2019 | Nakagawa |
| 2021/0300274 A1 | 9/2021 | Manawadu et al. |
| 2022/0114817 A1 | 4/2022 | Gronau |

\* cited by examiner

DETECTION SYSTEM WITH A SINGLE MODE LASER FOR A VEHICLE

CROSS-REFERENCE TO RELATED APPLICATION

This application claims priority to and the benefit under 35 U.S.C. § 119(e) of U.S. Provisional Application No. 63/422,482, filed on Nov. 4, 2022, entitled "DETECTION SYSTEM WITH A SINGLE MODE LASER FOR A VEHICLE," the disclosure of which is hereby incorporated herein by reference in its entirety.

FIELD OF THE DISCLOSURE

The present disclosure generally relates to a detection system with an array of lasers for monitoring an interior of a vehicle, and, more particularly, to a structured light device that utilizes an array of single mode lasers for monitoring an interior of a vehicle.

SUMMARY OF THE DISCLOSURE

According to one aspect of the present disclosure, a detection system for a vehicle includes an imaging device configured to capture an image of an interior surface of the vehicle. An illumination assembly includes an array of laser diodes each configured to project an illumination, each laser diode is configured as at least one of a single mode laser or a vertical-cavity surface-emitting laser ("VCSEL"). An optical element is proximate to the array of laser diodes and includes a collimation element for guiding the illumination to form at least one light spot. A processor is in communication with the imaging device and the illumination assembly. The processor is configured to communicate a signal to operate the array of laser diodes and process the image of the interior surface to detect at least one of a change in a location or a speckle content of the at least one spot.

According to another aspect of the present disclosure, a detection system includes an imaging device configured to capture an image in a field of view. An illumination assembly is configured to illuminate the field of view with a spot array pattern. The illumination assembly includes a plurality of vertical-cavity surface-emitting laser diodes ("VCSELs") arranged in a laser diode array and configured to project a plurality of illuminations. An optical element is configured to collimate the plurality of illuminations into at least one light spot. A processor is in communication with the imaging device and the illumination assembly. The processor is configured to communicate a signal to operate the laser diode array, process the image of the interior to determine a position of the at least one spot in the spot array pattern, and extract a depth of the surface based on the position of the at least one spot.

According to yet another aspect of the present disclosure, a detection system includes an imaging device configured to capture an image in a field of view. An illumination assembly is configured to illuminate the field of view with a spot array pattern. The illumination assembly includes a plurality of single mode lasers arranged in a laser diode array and configured to project a plurality of illuminations. An optical element is configured to collimate the plurality of illuminations into at least one light spot. A processor is in communication with the imaging device and the illumination assembly. The processor is configured to communicate a signal to operate the laser diode array, process the image of the interior to detect a change in a speckle content of the at least one spot in the spot array pattern, and identify a condition within the interior based on the detected change in the speckle content.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in a combination of apparatus components related to a detection system for a vehicle.

Figure 1:
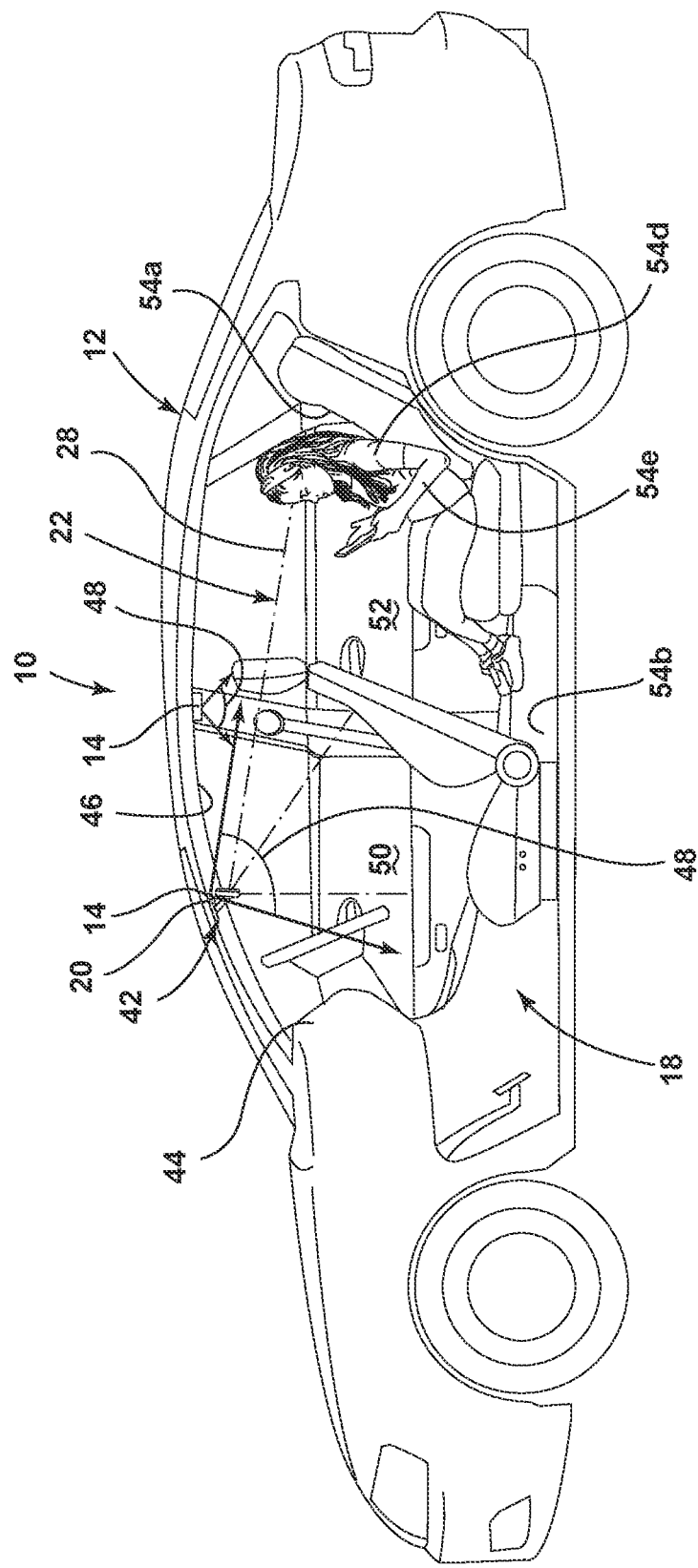
FIG. 1 is a side elevational view of a portion of a vehicle incorporating a detection system, according to an aspect of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "approximately," the phrase "approximately equal to," and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

Referring to FIGS. 1-6, reference numeral 10 generally refers to a detection system 10 for a vehicle 12. The detection system 10 includes an imaging device 14 configured to capture an image 16 (FIGS. 2-4) of an interior 18 of the vehicle 12. An illumination assembly 20 is configured to illuminate the interior 18 with a spot array structured light pattern 22. The illumination assembly 20 includes an array 24 of laser diodes 26, each configured to project an illumination 28 (e.g., at least one beam 36). The illumination assembly 20 further includes an optical element 30 (i.e., a lens) proximate to the array 24. The optical element 30 includes a collimation element 32 and a diffractive element 34 for guiding the illumination 28 to form at least one light spot 56. A processor 38 (e.g., one or more processors) is in communication with the imaging device 14 and the illumination assembly 20. The processor 38 is configured to communicate a signal to operate the array 24 of laser diodes 26. The processor 38 is further configured to process the image 16 of the interior 18 to detect a change in at least one of a light distribution 40 (i.e., positioning of at least one spot 56) or a speckle content of the at least one light spot 56. The processor 38 is further configured to determine a presence of an occupant in the interior 18 based on the change in at least one of the light distribution 40 and the speckle content.

Now referring to FIG. 1, the illumination assembly 20 and the imaging device 14 are located in the interior 18 of the vehicle. More particularly, the imaging device 14 and the illumination assembly 20 may be coupled with a rearview assembly, such as a rearview mirror assembly 42 that includes an electro-optic device (not shown). For example, the electro-optic device may be a single-layer component, a single-phase component, a multi-layer component, and/or a multi-phase component that can be switched between a partially transmissive state and a partially reflective state. In other examples, the imaging device 14 and the illumination assembly 20 are coupled with a dashboard 44 of the vehicle 12, an overhead console 46 of the vehicle 12, or another portion of the vehicle 12. The imaging device 14 may be packaged (i.e., adjacently located in a static relationship) with the illumination assembly 20. The imaging device 14 is positioned to capture images 16 (FIGS. 2-4) of the interior 18 of the vehicle 12. The laser diodes 26 may be configured as one or more single mode lasers, such as one or more vertical-cavity surface-emitting lasers 68 ("VCSELs") as illustrated in FIG. 5. However, it should be appreciated that other types of light sources, for example, other types of single mode lasers, a Photonic Crystal Surface-Emitting Lasers ("PCSEL"), being one example, may be used. The illumination 28 from the laser diodes 26 may be within a wavelengths spectrum, for example, the infrared (IR) spectrum. Accordingly, in some examples, the imaging device 14 is a camera operable within the IR spectrum (or other spectrums corresponding to the illumination 28) to allow the spot array pattern 22 to be captured. The imaging device 14 may be a stereoscopic imager, a light detector, a camera, and/or the like. In general, the imaging device 14 may have a field of view 48 that covers one or both of a front compartment 50 and a rear compartment 52 of the interior 18. In this way, an imaging device 14 of the present disclosure, may be configured to capture images 16 of at least one surface 54a-54f in the interior 18, such as a seating surface 54a, a floor surface 54b, a paneling surface 54c, or the like. In some examples, the surface 54a-54f in the interior 18 corresponds to an occupant of the vehicle 12, such as a covering surface 54d (e.g., clothing or a blanket), a body surface 54e, a car seat surface 54f, and/or the like.

Figure 2:
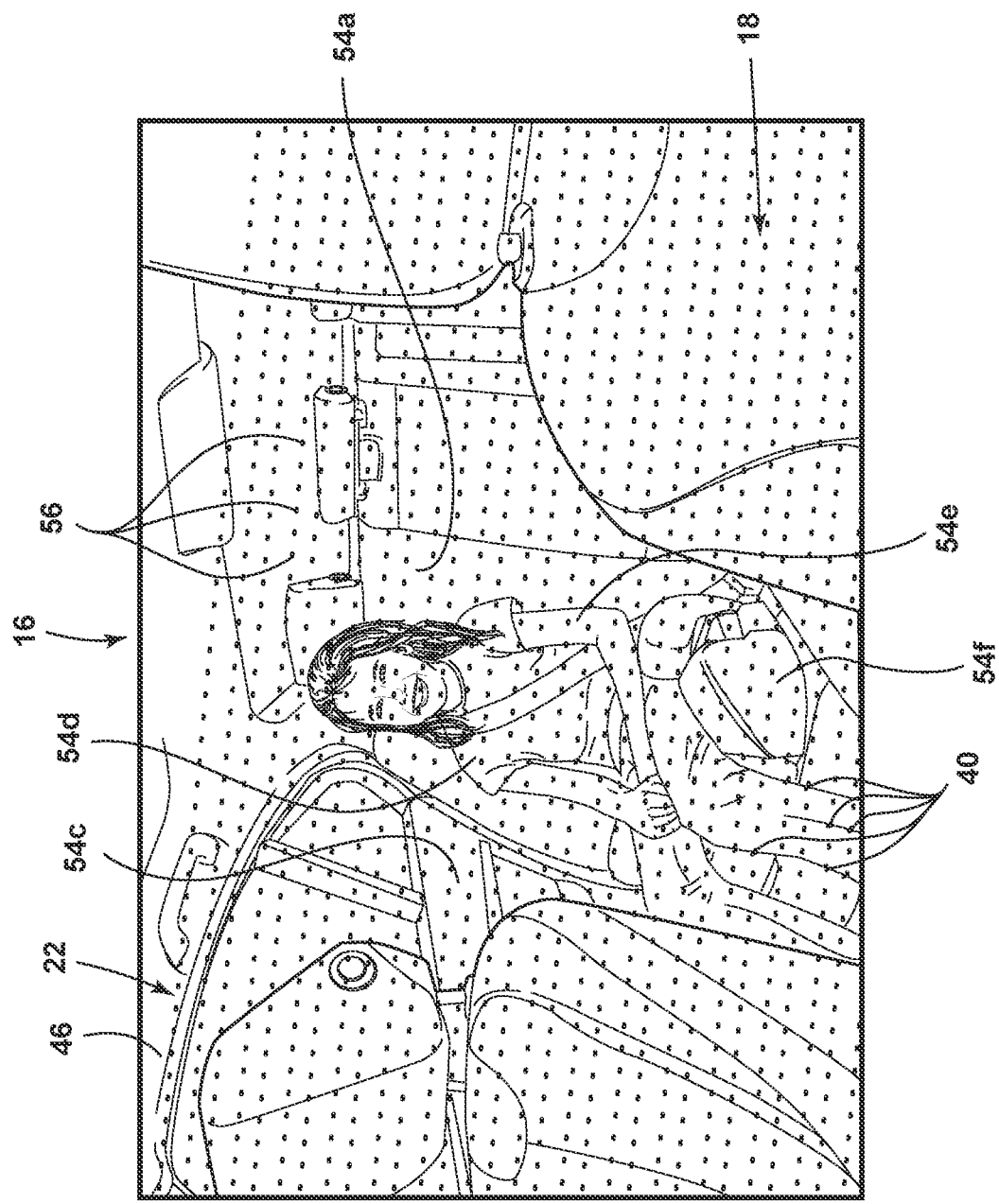
FIG. 2 is an exemplary image captured by an imaging device showing a spot array pattern projected from an illumination assembly of the detection system onto an occupant of a vehicle, according to an aspect of the present disclosure.

Referring now to FIGS. 1 and 2, the imaging device 14 is configured to capture images 16 of the spot array pattern 22 projected into the interior 18 of the vehicle 12. For example, the spot array pattern 22 may include a plurality of light spots 56 and each light spot 56 may define a variety of shapes, such as circles, dots, line segments, or other geometric shapes projected in the spot array pattern 22. Each spot 56 may have an intensity, luminescence, and/or the like. The distribution of light spots 56 in the spot array pattern 22 may be uniform (e.g., rows and columns, concentric shapes, and/or the like) or non-uniform such as pseudo-random distribution. The spot array pattern 22 conforms to the surface 54a-54f in the interior 18 where the light spots 56 are reflected back from the surface 54a-54f and captured by the imaging device 14. In some embodiments, the light sources (e.g., the laser diodes 26) are distributed in an array, for example, an array with a rectangular perimeter defined by rows and columns of light sources. In other embodiments, the array of light sources may be distributed in other uniform or non-uniform patterns.

Regardless of the shape and distribution of the light spots 56, when the surface 54a-54f reflecting the light spot 56 moves, the light spots 56 also move and this movement is captured by the imaging device 14. Under a first mode of operation, the processor 38 may process the images 16 captured by the imaging device 14 and extrapolate movement of light spots 56 into a depth of the surface 54a-54f based on the principles of triangulation and known geometries between imaging device 14, the illumination assembly 20, and the distribution of light spot array 22. For example, the processor 38 may be configured to determine movement based on an outer perimeter or a center of gravity of each light spot 56. Under the first mode of operation, the imaging device 14 and illumination assembly 20 may be closely and rigidly fixed on a common optical bench structure (e.g., within the rearview mirror or other shared location) and, based on the known spacing between the imaging device 14 and illumination assembly 20 (e.g., the laser diodes 26) and distribution of the light spot array 22, the reflected light spot 56 location can be captured along an epipolar line, which, in turn, can be triangulated to extract a depth of the surface 54a-54f. The depth of the surface 54a-54f at each light spot 56 can then be used to extrapolate a contour of the surface 54a-54f. Likewise, changes in depth can be used to extrapolate the present location of the surface 54a-54f and movement of the surface 54a-54f as a function of time.

In the illustrated example of FIGS. 1 and 2, the light spots 56 covers a rear seating structure of the vehicle 12 and may reflect from the body surface 54e of a child, the car seat surface 54f the child is seated in, the covering surface 54d (e.g., clothing), and the seating surface 54a. Thus, these particular light spots 56 may be divided into a closer portion or a further portion from the imaging device 14 and/or the illumination assembly 20 based on the first mode of operation. Based on this varying depth, light spots 56 in the spot array pattern 22 will move to conform to the surface 54, which, in turn, will be captured as movement along epipolar lines of the image 16. The processor 38 detects the position of the plurality of light spots 56 and extrapolates the present position of the various surfaces 54a, 54e, and 54f to monitor various conditions within the vehicle 12. For example, the presence and shape (or changes in shape as a function of time) of the body surface 54e or covering surface 54d with respect to the spot array pattern 22. It is contemplated that the processor 38 may have one or more occupancy detection algorithms, object detection algorithms, or the like, for differentiating the identity of various objects to be in the interior 18. In this manner, under the first mode of operation, a spatial mapping of the interior 18 may be employed to identify the presence, three-dimensional ("3D") positioning, and 3D shape of the object, such as the occupant. It is contemplated that the image 16 illustrated in FIG. 2 presents the spot array pattern 22 visibly, though, as previously described, the illumination 28 may be in a visible or non-visible wavelength spectrum, such as the IR spectrum. When the illumination is in the IR spectrum, the image 16 illustrates the image that may be captured by an imaging device (e.g., an IR imager).

Figure 4:
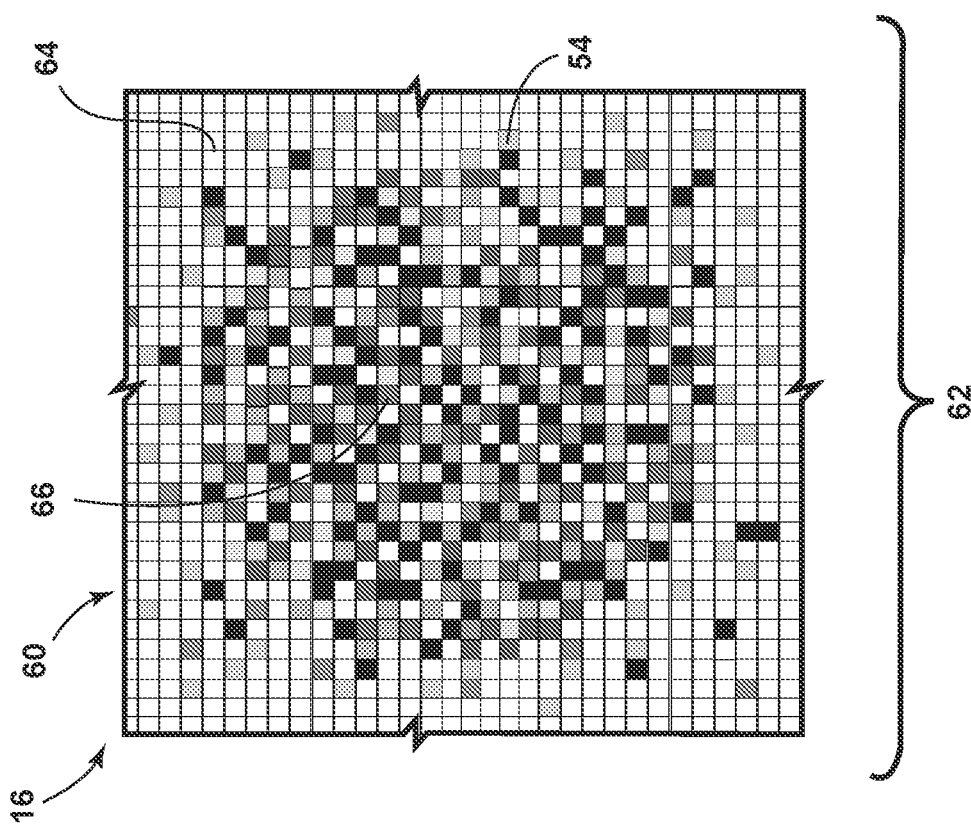
FIG. 4 is an image of the light spot captured by the imagining device after a micro-motion of the surface depicted in FIG. 3 had occurred, according to an aspect of the present disclosure.
Figure 3:
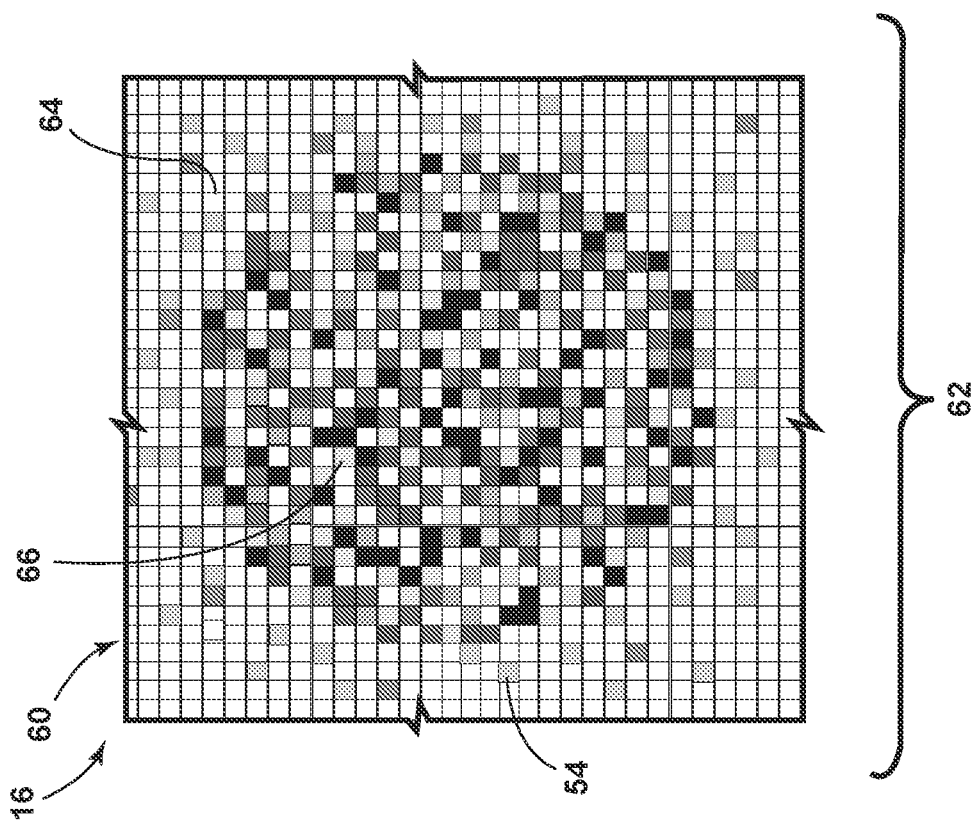
FIG. 3 is an image captured by an imaging device of the detection system illustrating a single light spot of a spot array pattern projected onto a surface in a cabin of a vehicle, according to an aspect of the present disclosure.
Figure 5:
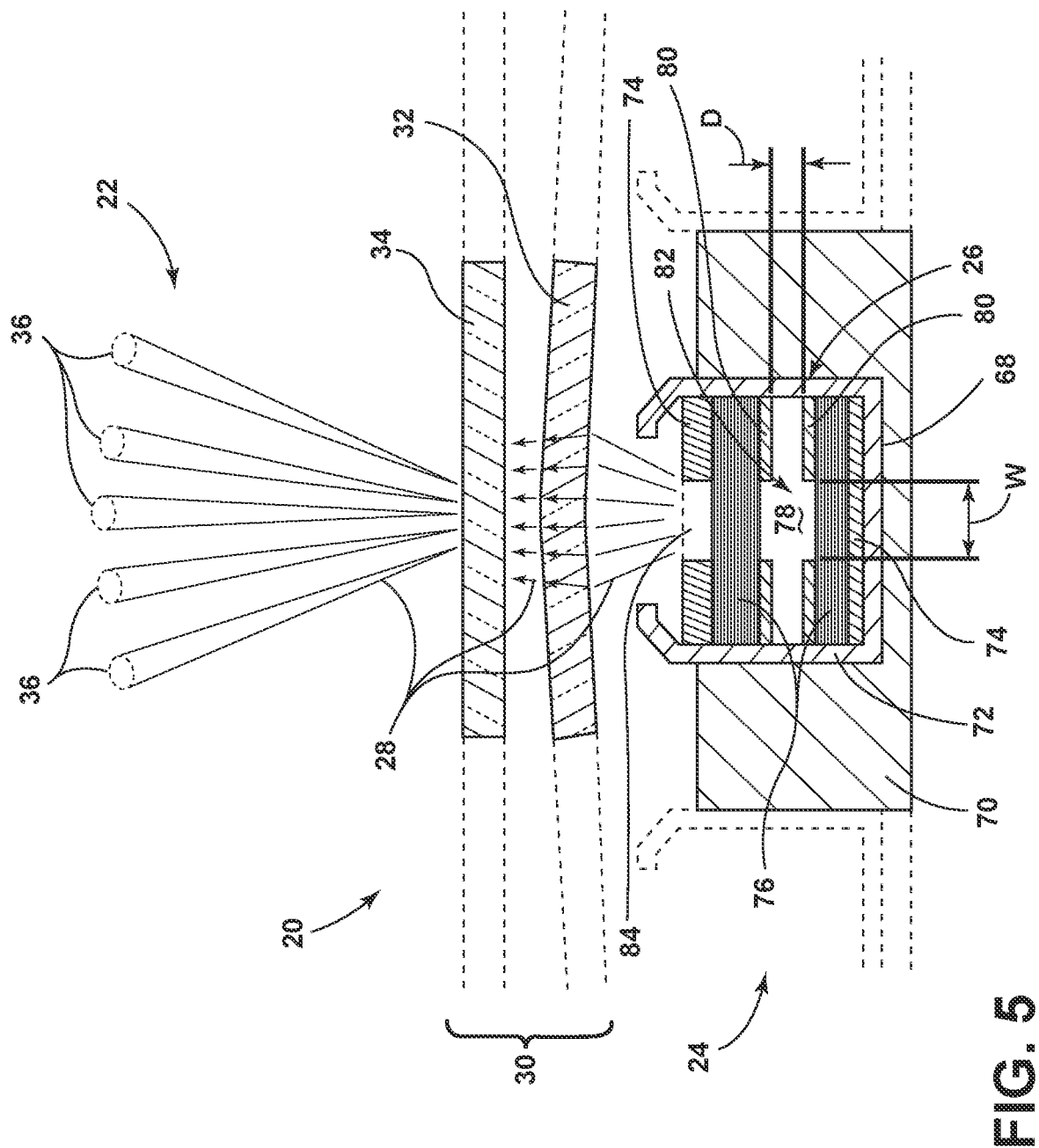
FIG. 5 is a cross-sectional side elevational view of an illumination assembly, according to an aspect of the present disclosure.

Referring now to FIGS. 3 and 4, in a second mode of operation, a speckle content of each reflected light spot 56 can be monitored to detect internal intensity distribution changes of the surface 54a-54f under the principles of speckle interferometry, such as tilting or other movements in a micro-scale (e.g., a micrometer or a micro-radian scale). For example, when a surface 54a-54f exhibits roughness, micro-radian changes in tilt affect the reflection of light spot 56 and, therefore, also the speckle content. The imaging device 14 and the illumination assembly 20 may be spaced from one another in accordance with the second mode of operation. For example, the illumination assembly 20 and the imaging device 14 may be located in different locations around the interior 18. However, it should be appreciated that a single imaging device 14 may be packaged with the illumination assembly 20 and utilized for both the first and second modes of operation. The illumination 28 in accordance with the second mode of operation may be in a non-visible wavelength spectrum, such as the IR spectrum. In this manner, a single illumination assembly 20 may be configured to project an illumination within a spectrum detectable in both the first and second modes of operation.

With continued reference to FIGS. 3 and 4, the micro-scale detection can be utilized for monitoring a physiological condition of an occupant that may be difficult under the first mode of operation. For example, various vital signs of the occupant can be monitored by detecting micro motion of the occupant (e.g., the body surface 54e), the covering surface 54d, and the car seat surface 54f. In this manner, even if light spots 56 are not reflected directly from the body surface 54e, micro-scale movements from the occupant are imparted on surfaces 54a-54f surrounding the occupant (e.g., the covering surface 54d and the car seat surface 54f) that can be detected, thus allowing occupants presence detection without a direct line of sight to the occupant's body. This can be particularly beneficial in scenarios where a child is in a rear-facing car seat and/or covered by a blanket. More particularly, the speckle content of each light spot 56 is captured in image data 60 by the imaging device 14. More particularly, FIG. 3 shows image data 60 of one of the reflected light spots 56 that is projected onto a surface 54, and FIG. 4 shows image data 60 of the reflected light spot 56 after the surface 54a-54f has changed position. It is contemplated that a timing between the image data 60 captured in FIGS. 3 and 4 may be within one second, a millisecond, a microsecond, or any interval of time that allows for detection of small changes in position (e.g., micro-scale) of the surface 54a-54f. The speckle content in the image data 60 includes a pixel array 62 having corresponding values associated with each pixel. For example, the pixel array 62 may have pixel data that includes at least one value corresponding to a grayscale intensity value that corresponds to the level of reflected light toward the imaging device 14. In general, under constant lighting conditions and no changes of position of the surface 54, the intensity values, or the pixel values, for each of the pixels in the pixel array 62, remain relatively constant or within a threshold range/profile of grayscale intensity. For example, because the imaging device 16 may be configured to capture micro-scale changes in position, some "noise" may be presented in the image data 60 thereby affecting the pixel values. The processor 38 of the present disclosure may be configured to differentiate between the noise and actual movement of the object in the interior 18 of the vehicle 12. For example, in some embodiments, the processor 38 may be configured to determine a baseline amount of noise (e.g., engine vibrations, road conditions, or other external factors that affect relative movement between the illumination assembly 20, the imaging device 14, and the surface 54). This baseline may be determined by comparing and/or profiling changes in position of light spots 56 (i.e., under the first mode of operation) or changes in speckle content of a light spot 56 (i.e., under the second mode of operation).

Still referring to FIGS. 3 and 4, the pixel array 62 may include a first portion 64 corresponding to an area surrounding the light spot 56 and a second portion 66 corresponding to the light spot 56. The second portion 66 may approximate the shape of the light spot 56, which, in this case, has a circular Gaussian shape within the second portion 66. Minor changes, differentiated from any noise, are detected by the processor 38. For example, the minor change or alteration of pixel values, as a result of positional changes (e.g., micrometer scale) of the surface 54a-54f (e.g., FIGS. 3 and 4) may correspond to a redistribution of the black or dark pixels.

As explained previously, the minor positional changes of the surface 54a-54f may correspond to vital signs of an occupant. These vital signs may include the presence, rate and magnitude of breathing, pulse, and/or other vital signs or physiological conditions of the occupant in the vehicle 12. It is contemplated that other small-scale movements toward, away from, or laterally relative to the imaging device 14 and/or the illumination assembly 20 may correspond with sources other than vital signs of an occupant within the vehicle 12, for example, simply the presence of the occupant. In general, the processor 38 of the present disclosure may be configured to execute breathing, pulse, or other detection algorithms for determining the presence of an occupant (i.e., a person or an animal). As will be described further, the processor 38 may be in communication with peripheral or remote devices in order generate a communication of the occupancy of the vehicle 12. Although not illustrated in detail, the processor 38 may evaluate some or all of the plurality of light spots 56 projected by the illumination assembly 20 and amalgamate the image data 60 corresponding with each of the plurality of light spots 56 to further refine the determination of the occupancy of the vehicle 12 and/or condition of the interior 18. For example, the processor 38 may employ one or more statistical modeling techniques to amalgamate or otherwise average the change in the pixel values of each light spot 56 in order to differentiate against noise and/or vibrations caused by movement of the vehicle 12 from operational factors (e.g., gear shifting, braking, engine vibrations, road conditions, and/or the like).

It is further contemplated that the pixel data presented in FIGS. 3 and 4 may have a lower or higher resolution than the resolution depicted. For example, each light spot 56 may comprise any number of pixels corresponding to the particular spot array pattern 22 employed and the particular resolution of the imaging device 14. In general, the processor 38 may be configured to employ the principles of speckle interferometry in the second mode of operation, and thus evaluate the spot array pattern 22 based on changes to the speckle content of each of the plurality of light spots 56. Thus, and as will be described further herein, the illumination assembly 20 may produce a sharp-speckled distribution within the spot array pattern 22. The second mode of operation is performed on a spot-by-spot basis of the individual reflections of the light spots 56.

Referring now to FIG. 5, the illumination assembly 20 is depicted with the laser diode 26 and the optical element 30 is aligned with the laser diode 26 (e.g., within the rearview mirror of the vehicle). The laser diode 26 may include a single laser diode 26 or a plurality of laser diodes 26 (as illustrated in the phantom lines) arranged in an array 24. Each laser diode 26 projects an illumination 28 (e.g., a plurality of beams 36). The laser diode 26 may be configured as the VCSEL 68 that is formed with or operatively coupled with a substrate 70, such as a printed circuit board, and oriented generally orthogonally relative to the substrate 70. The substrate 70 may also include driver circuitry 71 (FIG. 6) that is controlled via the processor 38 for generating electrical potentials for the VCSELs 68. The VCSELs 68 may be one of a plurality of VCSELs 68 arranged in the array 24 and include a housing 72 in which the various layers of the VCSELs 68 are disposed. For example, the VCSEL 68 may have a pair of electrodes 74 that sandwich a pair of reflective layers 76. Between the reflective layers 76 is a cavity 78 formed by a pair of oxide layers 80 that define an active region 82 in which the illumination 28 is amplified. The housing 72 defines an opening 84 generally aligned with the optical element 30 to allow the illumination 28 to be emitted from the VCSEL 68. The illumination 28 is then guided by the optical element 30 into one or more of the plurality of light spots 56. In some embodiments, the optical element 30 guides the illumination 28 from each VCSEL 68 (or other light source). In some embodiments, the optical element 30 includes a plurality of optical elements 30 (i.e., an array) that each guide the illumination 28 of two or more VCSELs 68 or a single VCSEL 68. In particular, the illumination 28 may be collimated by the collimation element 32, which may narrow the illumination 28 in a particular direction (e.g., generally perpendicular to the diffractive element 34). The diffractive element 34 may guide and replicate the collimated illumination 28 into the array 24. It should be appreciated that the collimation element 32 and the diffractive element 34 may be separate or integrally formed in the one or more optical elements 30 (i.e., lenses). It is contemplated that the above structure of the laser diode 26 may be one of a variety of arrangements that produces the illumination 28. For example, the various layers of the VCSEL 68 may include additional or less layers than described in order to produce a laser beam or laser illumination 28 to be guided by the optical element 30.

In general, the provision of an array 24 of VCSELs 68 (e.g., or other single mode lasers), as opposed to a single or multiple edge-emitting laser diodes 26, may provide for greater reliability and allow a large area within the field of view 48 of the imaging device 14 to be covered by the spot array pattern 22. For example, a zero-order suppression, which may be employed in the optical element 30 relative to peripheral distribution, may be lowered to improve eye safety. In addition, a single mode configuration for the VCSELs 68, may allow for the greater granularity of the pixel data as described above with relation to FIGS. 3 and 4. For example, referring back to FIG. 5, a width W and/or a depth D of the cavity 78 may be configured to produce a single spatial mode of the illumination 28. For example, an $m^2$ value for the illumination 28 projected from each of the VCSELs 68 may be approximately one or, in some examples, less than 1.3.

It is contemplated that the use of a single mode VCSEL 68 (e.g., or other single mode lasers such as a PCSEL) may result in a lower power consumption relative to the requirements of a multimode illumination source. The lower power consumption may allow for detection ranges suitable for the interior 18 of the vehicle 12. In general, the granularity of the light spot 56 in combination with the resolution of the imaging device 14 may allow the processor 38 to detect micro vibrations associated with one or more vital signs associated with the interior 18, as previously described.

Figure 6:
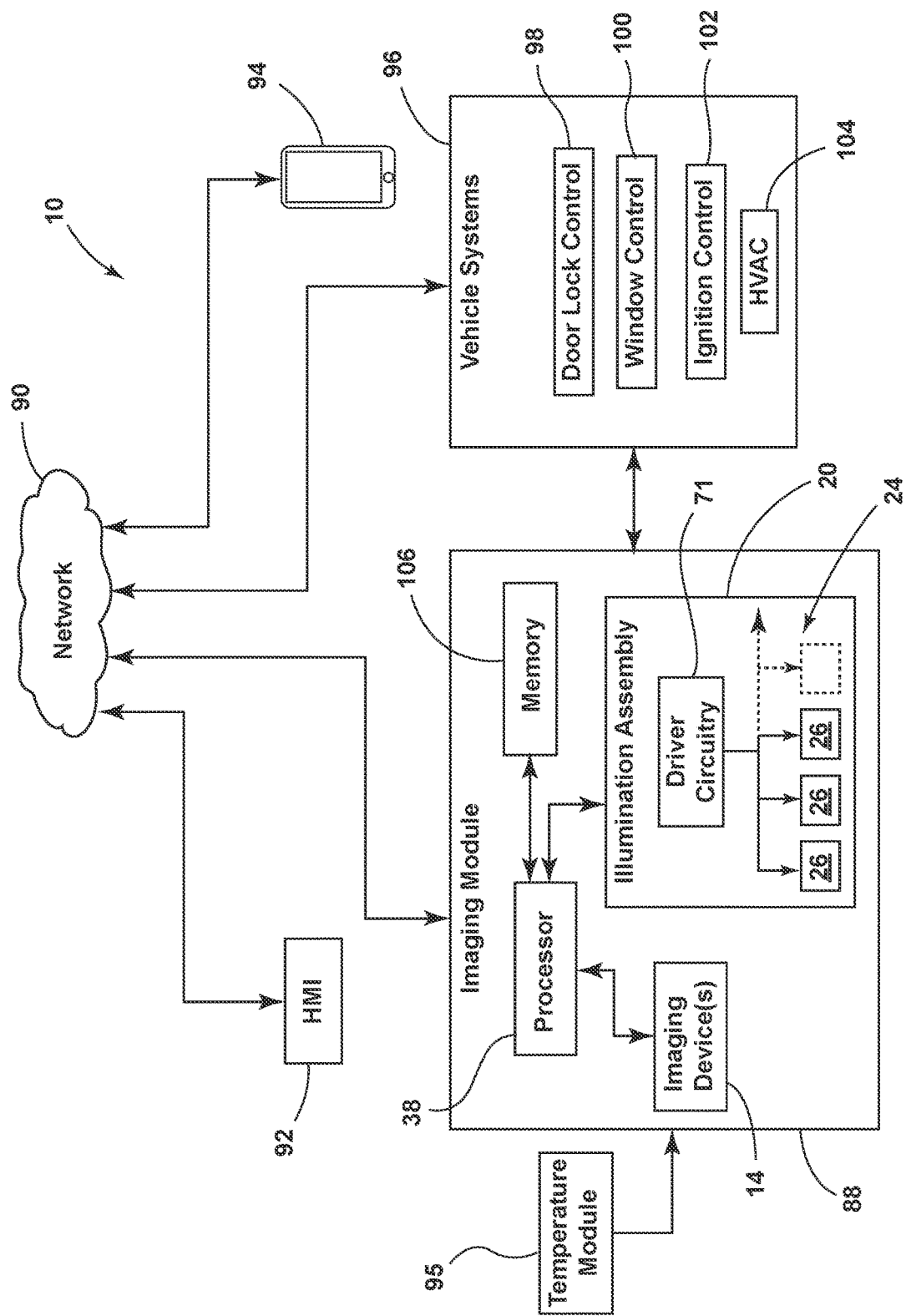
FIG. 6 is a block diagram of a detection system, according to an aspect of the present disclosure.

Referring now to FIG. 6, the illumination assembly 20, the imaging device 14, and the processor 38 may be incorporated as a single sensing module 88, which may include a central assembly or may have separate components within the vehicle 12. The sensing module 88 may be in communication with a network 90, such as a wireless or a wired network that may be operable to communicate with short- and/or long-wave communication protocols. For example, the network 90, may employ SMS, Wi-Fi, Ethernet, TCP/IP, 3G, 4G, 5G, or any other communication protocol to communicate instructions or signals between the sensing module 88 and one or more other devices. For example, the network 90 may provide communication between the sensing module 88 and one or more of a human-machine interface (HMI) 92 within the vehicle 12, as well as a mobile device 94 having an interface. Further, the sensing module 88 may have direct communication (e.g., a wired connection within the vehicle 12) to various vehicle systems 96. The sensing module 88 may be configured to communicate one or more instructions to the vehicle systems 96, such as a door lock control system 98, a window control system 100, and an ignition control system 102, a heating, ventilation, and air conditioning (HVAC) control system 104, or the like, to control the particular vehicle system 96 in response to determination of one or more alert conditions. The one or more alert conditions may be determined based on an analysis of the image data 60 as previously described. For example, upon detection of a left-behind condition (e.g., a person or animal locked in the interior 18 of the vehicle 12 which is otherwise unoccupied), the sensing module 88 may communicate with one of the vehicle systems 96 directly and/or via the network 90 to cause one or more responses. In the example described, the door lock control system 98 may, in response to the left behind condition, unlock the door, communicate a door-open control signal to an actuation device associated with the vehicle 12, or the like. In addition, or alternatively, the window control system 100 may, in response to receiving the left behind condition, control a window activation device to roll down or otherwise adjust one or more of the windows in the vehicle 12 between an open position and a closed position. More particularly, in a left-behind condition, the window control system 100 may open at least one window of the vehicle 12 in some examples. In other examples, the ignition control system 102 may, in response to the left behind condition, communicate an instruction to start the engine of the vehicle 12 and control the HVAC system 104 to project hot or cold air into the interior 18. In some embodiments, upon detecting the one or more alert conditions, the processor 38 may be configured to generate a visual and/or auditory alert within the vehicle and/or the mobile device 94.

In some embodiments, the processor 38 may receive instructions from a memory 106. The memory 106 may include a single disk or a plurality of disks (e.g., hard drives) and includes a storage management module that manages one or more partitions within the memory 106. In some embodiments, memory 106 may include flash memory, semiconductor (solid-state) memory, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 38, cause the processor 38 to, at least, perform the functions associated with the components of the detection system 10. It is contemplated that other vehicle 12 sub-systems may be in communication with the sensing module 88 and be configured to operate in response to a condition determined by the processor 38 of the present disclosure. For example, speakers or a display within the vehicle 12 may be utilized for generating an alert.

In addition, an alert signal or other communication may be communicated to the mobile device 94 and/or the HMI 92 in response to detection of an alert condition. It is contemplated that, although described in relation to the left behind condition, other conditions may be determined based on analysis of the image data 60 and the determination of micro vibrations of the vehicle 12. For example, the present sensing module 88 may serve as an optical microphone and employ the processor 38 for analysis of a mouth area on the occupant. Patterns associated with language, volume, or intensity of an audible signal may be applied to the image/video data and analyzed by the processor 38 to determine a distressed level of an occupant within the interior 18. In some embodiments, the sensing module 88 may include a temperature module 95 for detecting a current temperature in the vehicle. In this manner, when a left behind condition is detected, the processor 38 may receive the current temperature from the temperature module 95 to determine if the current temperature is within a threshold (e.g., too hot or too cold) that requires intervention via the vehicle systems 96 (e.g., rolling down a window, heating, or cooling).

In some embodiments, the processor 38 may be configured to generate a communication before a transmission of the vehicle 12 is placed in a drive mode or after the transmission of a vehicle is placed in park mode. In some embodiments, the processor 38 may be configured to generate a communication (e.g., to the mobile device 94 or a display within the vehicle 12) if an occupant is detected in the interior 18 (e.g., the rear compartment 52) and a driver is not detected for a predetermined amount of time. In some embodiments, the processor 38 may be configured to generate a communication (e.g., to the mobile device 94 or a display within the vehicle 12) if an occupant is detected in the interior 18 (e.g., the rear compartment 52) and the vehicle has reached a destination. For example, if a vehicle reaches a destination but a door providing access to the interior 18 has not been opened for a predetermined amount of time, the processor 38 may be configured to generate the communication. In some embodiments, the processor 38 may be configured to employ the first mode of operation to detect an occupant. If an occupant is undetected by the first mode of operation, the processor 38 may be further configured to employ the second mode of operation. In general, under the principles of the first and/or second modes of operation, the processor 38 may be configured to generate a communication that corresponds to detecting an occupant, not detecting an occupant, no longer detecting an occupant that was previously detected, and other scenarios.

Incorporation of single mode VCSELs 68 (e.g., or other single mode lasers such as a PCSEL) for in-cabin monitoring may be an unexpected, or seemingly counterintuitive, solution for in-cabin monitoring, but the detection system 10 of the present disclosure may employ such a system in order to detect micro-scale movements or other minor movements in the vehicle 12. Typically, multi-mode lasers are preferred for such detection methods due to smoothness of the illumination regions and higher power levels. However, the detection system 10 of the present disclosure may utilize the granularity of the speckle distribution produced by the single mode. VCSELs 68 are used in order to effectively track the micro-vibrations with the interior 18 in a cost-effective and more compact manner. Moreover, VCSELs 68 require smaller packing requirements and exhibit smaller divergence angles. Thus, by packaging the array 24 of the VCSELs 68 with optical element 30 of the present disclosure, a more efficient and effective detection system 10 may be provided. Further, because the VCSELs 68 (e.g., or other single mode lasers such as a PCSEL) may be packaged in arrays 24, fewer replications to the illumination 28 may be required for optimized performance and the diffractive element 34 can be simplified or not included.

It will be appreciated that embodiments of the disclosure described herein may be comprised of one or more conventional processors and unique stored program instructions that control one or more processors to implement, in conjunction with certain non-processor circuits, some, most, or all of the functions of a display mirror assembly, as described herein. The non-processor circuits may include, but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The disclosure herein is further summarized in the following paragraphs and is further characterized by combinations of any and all of the various aspects described therein.

According to one aspect of the present disclosure, a detection system for a vehicle includes an imaging device configured to capture an image of an interior surface of the vehicle. An illumination assembly includes an array of laser diodes each configured to project an illumination, each laser diode is configured as at least one of a single mode laser or a vertical-cavity surface-emitting laser ("VCSEL"). An optical element is proximate to the array of laser diodes and includes a collimation element for guiding the illumination to form at least one light spot. A processor is in communication with the imaging device and the illumination assembly. The processor is configured to communicate a signal to operate the array of laser diodes and process the image of the interior surface to detect at least one of a change in a location or a speckle content of the at least one spot.

According to another aspect, a processor is further configured to determine a presence of a vehicle occupant with a change in a location or a speckle content of at least one spot.

According to yet another aspect, a processor is further configured to detect a vital sign of a vehicle occupant by changes in a speckle content as a result of movement in the micrometer or micro-radian scale.

According to still yet another aspect, the vital sign includes at least one of a rate and magnitude of breathing or a pulse.

According to another aspect, determining a change in the speckle content of an at least one spot includes comparing first pixel data of the at least one spot captured at a first time to second pixel data of the at least one spot captured at a second time that is after the first time.

According to another aspect, a processor is further configured to detect movement of a vehicle occupant by capturing a change in a location of an at least one spot and extrapolate a depth and contour of the interior surface based on the change in the location of the at least one spot.

According to yet another aspect, a processor is further configured to detect a left behind condition if a vehicle occupant is in a rear compartment of a vehicle and a driver is not detected.

According to still yet another aspect, the processor is configured to generate an alert after a left behind condition is detected.

According to another aspect, a temperature detection module communicates a current temperature within a vehicle to a processor and the processor is configured to generate a signal to a vehicle system to at least one of open a window or control an HVAC system after a left behind condition is detected and the current temperature is within a threshold.

According to another aspect, an at least one light spot includes a plurality of light spots in a spot array.

According to yet another aspect, each laser diode in an array of laser diodes is a VCSEL.

According to still yet another aspect, each of a plurality of laser diodes is spaced uniformly on a common substrate.

According to another aspect, each laser diode in an array of laser diodes is a single mode laser.

According to another aspect of the present disclosure, a detection system includes an imaging device configured to capture an image in a field of view. An illumination assembly is configured to illuminate the field of view with a spot array pattern. The illumination assembly includes a plurality of vertical-cavity surface-emitting laser diodes ("VCSELs") arranged in a laser diode array and configured to project a plurality of illuminations. An optical element is configured to collimate the plurality of illuminations into at least one light spot. A processor is in communication with the imaging device and the illumination assembly. The processor is configured to communicate a signal to operate the laser diode array, process the image of the interior to determine a position of the at least one spot in the spot array pattern, and extract a depth of the surface based on the position of the at least one spot.

According to another aspect, a diffractive element is configured to guide and replicate an illumination from a collimation element.

According to yet another aspect, each of a plurality of VCSELs is configured as a single mode laser diode.

According to still yet another aspect, a processor is further configured to determine a presence of a vehicle occupant by extrapolating a contour of an interior surface based on an extracted depth.

According to another aspect, a processor is configured to determine a presence of a vehicle occupant and detect a vital sign of the vehicle occupant by changes in a speckle content as a result of movement in the micrometer or micro-radian scale.

According to yet another aspect of the present disclosure, a detection system includes an imaging device configured to capture an image in a field of view. An illumination assembly is configured to illuminate the field of view with a spot array pattern. The illumination assembly includes a plurality of single mode lasers arranged in a laser diode array and configured to project a plurality of illuminations. An optical element is configured to collimate the plurality of illuminations into at least one light spot. A processor is in communication with the imaging device and the illumination assembly. The processor is configured to communicate a signal to operate the laser diode array, process the image of the interior to detect a change in a speckle content of the at least one spot in the spot array pattern, and identify a condition within the interior based on the detected change in the speckle content.

According to another aspect, the condition within the interior is a vital sign of a vehicle occupant detected by changes in the speckle content as a result of movement in the micrometer or micro-radian scale.

According to one aspect of the present disclosure, a detection system for a vehicle includes an imaging device configured to capture an image of an interior of the vehicle. An illumination assembly includes an array of laser diodes each configured to project an illumination. An optical element is proximate to the array of laser diodes and includes a collimation element for guiding the illumination to form at least one light spot. A processor is in communication with the imaging device and the illumination assembly. The processor is configured to communicate a signal to operate the array of laser diodes, process the image of the interior to detect at least one of a location or a change in speckle content of the at least one spot.

According to another aspect of the present disclosure, an illumination assembly of a detection system for a vehicle includes an array of light sources coupled to at least one substrate, each of the light sources are configured to project an illumination forming a spot array pattern. The spot array pattern is directed toward an interior of the vehicle. An optical element is proximate to the array and includes a collimation element collimating the illumination and a diffractive element diffracting the illumination to form at least one light spot.

According to another aspect of the present disclosure, an illumination assembly of a detection system for a vehicle includes an array of light sources coupled to at least one substrate, each of the light sources are configured to project an illumination forming a spot array pattern. The spot array pattern is directed toward an interior of the vehicle. An optical element is proximate to the array and includes a collimation element collimating the illumination to form at least one light spot.

According to another aspect of the present disclosure, a detection system includes an array of single mode vertical-cavity surface-emitting lasers ("VCSELs") and an optical element for guiding light emitted from the array of VCSELs into a spot array pattern. The spot array pattern includes a plurality of light spots projected onto a surface in the cabin and each spot includes a speckle content. An imaging device is provided to capture images of at least one of the plurality of light spots that includes changes to the speckle content in pixel data. At least one processor is in communication with the imaging device and the array of VCSELs and is configured to communicate an instruction to project the spot array pattern. The at least one processor is further configured to detect changes in the pixel data of at least one light spot and determine, based on the detection, a micro change in a position of the surface.

According to another aspect of the present disclosure, a detection system includes an imaging device configured to capture an image in a field of view. An illumination assembly is configured to illuminate the field of view with a spot array pattern. The illumination assembly includes a plurality of vertical-cavity surface-emitting lasers ("VCSELs") arranged in an array of VCSELs configured to project a plurality of illuminations. An optical element is configured to collimate the plurality of illuminations and diffract each of the plurality of illuminations into at least one light spot projected onto a surface of an interior of a vehicle. A processor is in communication with the imaging device and the illumination assembly. The processor is configured to communicate a signal to operate the array of VCSELs, process the image of the interior to determine a position of the at least one spot in the spot array pattern, and determine the depth of the surface based on the position of the at least one spot.

It will be understood by one having ordinary skill in the art that construction of the described disclosure and other components is not limited to any specific material. Other exemplary embodiments of the disclosure may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

What is claimed is:

1. A detection system for a vehicle, comprising:
    an imaging device configured to capture an image of an interior surface of the vehicle;
    an illumination assembly including:
        an array of laser diodes each configured to project an illumination, each laser diode being configured as at least one of a single mode laser or a vertical-cavity surface-emitting laser ("VCSEL");
        an optical element proximate to the array of laser diodes and including a collimation element for guiding the illumination to form an at least one light spot; and
    a processor in communication with the imaging device and the illumination assembly, the processor configured to communicate a signal to operate the array of laser diodes, process the image of the interior surface to detect both a change in a location of the at least one light spot and pixel data that includes a speckle content of the at least one light spot corresponding to a grayscale intensity value that corresponds to the level of reflected light from the at least one light spot toward the imaging device.

2. The detection system of claim 1, wherein the processor is further configured to determine a presence of a vehicle occupant with the change in the location or the speckle content of the at least one light spot.

3. The detection system of claim 2, wherein the processor is further configured to detect a vital sign of the vehicle occupant by changes in the speckle content as a result of movement in a micrometer or micro-radian scale.

4. The detection system of claim 3, wherein the vital sign includes at least one of a rate and magnitude of breathing or a pulse.

5. The detection system of claim 2, wherein determining the change in the speckle content of the at least one light spot includes comparing first pixel data of the at least one light spot captured at a first time to second pixel data of the at least one light spot captured at a second time that is after the first time.

6. The detection system of claim 2, wherein the processor is further configured to detect movement of the vehicle occupant by capturing the change in the location of the at least one light spot and extrapolate a depth and contour of the interior surface based on the change in the location of the at least one light spot.

7. The detection system of claim 2, wherein the processor is further configured to detect a left behind condition if the vehicle occupant is in a rear compartment of the vehicle and a driver is not detected.

8. The detection system of claim 7, wherein the processor is configured to generate an alert on a mobile device associated with the driver after a left behind condition is detected.

9. The detection system of claim 7, further including a temperature detection module communicating a current temperature within the vehicle to the processor, wherein the processor is configured to generate a signal to a vehicle system to at least one of open a window or control an HVAC system after the left behind condition is detected and the current temperature is within a threshold.

10. The detection system of claim 1, wherein the at least one light spot includes a plurality of light spots in a spot array.

11. The detection system of claim 1, wherein each laser diode in the array of laser diodes is configured as the VCSEL.

12. The detection system of claim 9, wherein each laser diode is spaced uniformly on a common substrate.

13. The detection system of claim 1, wherein each laser diode in the array of laser diodes is configured as the single mode laser.

14. A detection system for a vehicle, comprising:
an imaging device configured to capture an image in a field of view of an interior surface of the vehicle;
an illumination assembly configured to illuminate the field of view with a structured light pattern, the illumination assembly including:
   a plurality of vertical-cavity surface-emitting laser diodes ("VCSELs") arranged in a laser diode array and configured to project a plurality of illuminations; and
   at least one optical element configured to collimate the plurality of illuminations into the structured light pattern having a plurality of light spots; and
a processor in communication with the imaging device and the illumination assembly, the processor configured to communicate a signal to operate the laser diode array, process the image of the interior surface to determine a position of plurality of light spots in the structured light pattern, and extract a depth of the interior surface based on the position of the plurality of light spots.

15. The detection system of claim 14, wherein the optical element further includes a diffractive element configured to guide and replicate the illumination from a collimation element and increase the number of the plurality of light spots from the plurality of illuminations.

16. The detection system of claim 15, wherein the at least one optical element includes a plurality of optical elements, each optical element in alignment with one of the plurality of illuminations.

17. The detection system of claim 14, wherein the processor is further configured to determine a presence of a vehicle occupant by extrapolating a contour of the interior surface based on the extracted depth.

18. The detection system of claim 14, wherein the processor is further configured to determine a presence of a vehicle occupant and detect a vital sign of the vehicle occupant by changes in a speckle content of at least one of the plurality of light spots as a result of movement in a micrometer or micro-radian scale.

19. A detection system, comprising:
an imaging device configured to capture an image in a field of view of a surface of an object;
an illumination assembly configured to illuminate the field of view with a spot array pattern, the illumination assembly including:
   a plurality of single mode lasers arranged in a laser diode array and configured to project a plurality of illuminations; and
   an optical element configured to collimate the plurality of illuminations into at least one light spot; and
a processor in communication with the imaging device and the illumination assembly, the processor configured to communicate a signal to operate the laser diode array, process the image of the surface of the object to develop a baseline amount of vibrations based on environmental factors, to detect a change in a speckle content of the at least one light spot in the spot array pattern outside of the baseline, and identify a condition of the object based on the detected change in the speckle content outside of the baseline.

20. The detection system of claim 19, wherein the object is a vehicle occupant and the condition is a vital sign of the vehicle occupant detected by changes in the speckle content as a result of movement of the vehicle occupant in a micrometer or micro-radian scale.

* * * * *